United States Patent
Smith

(10) Patent No.: US 9,992,252 B2
(45) Date of Patent: Jun. 5, 2018

(54) METHOD AND APPARATUS FOR ADAPTIVELY COMPRESSING STREAMING VIDEO

(71) Applicant: RGB SYSTEMS, INC., Anaheim, CA (US)

(72) Inventor: Peter Lionel Smith, Bromley (GB)

(73) Assignee: RGB SYSTEMS, INC., Anaheim, CA (US)

( * ) Notice: Subject to any disclaimer, the term of this patent is extended or adjusted under 35 U.S.C. 154(b) by 292 days.

(21) Appl. No.: 14/868,941

(22) Filed: Sep. 29, 2015

(65) Prior Publication Data

US 2017/0093947 A1    Mar. 30, 2017

(51) Int. Cl.
| | |
|---|---|
| *H04N 19/152* | (2014.01) |
| *H04N 19/176* | (2014.01) |
| *H04L 29/06* | (2006.01) |

(52) U.S. Cl.
CPC ......... *H04L 65/607* (2013.01); *H04N 19/152* (2014.11); *H04N 19/176* (2014.11)

(58) Field of Classification Search
CPC ........... H04N 19/152; H04N 21/23655; H04N 21/2343; H04N 21/23805
See application file for complete search history.

(56) References Cited

U.S. PATENT DOCUMENTS

| | | |
|---|---|---|
| 4,442,454 A | 4/1984 | Powell |
| 4,754,336 A | 6/1988 | Nishizawa |

(Continued)

FOREIGN PATENT DOCUMENTS

| | | |
|---|---|---|
| EP | 0497545 A2 | 1/1992 |
| EP | 0497545 A2 | 8/1992 |

(Continued)

OTHER PUBLICATIONS

Tae Won Hur et al., An Image Coding Using Overlapped Wavelet Transform with Permutation Scan, Circuits and Systems 1996, IEEE Asia Pacific Conference on Circuits and Systems, Nov. 18, 1996, pp. 14-17, ISBN: 0-7803-3702-6, New York, NY United States of America.

(Continued)

*Primary Examiner* — Obafemi Sosanya
(74) *Attorney, Agent, or Firm* — Knobbe, Martens, Olson & Bear LLP

(57) ABSTRACT

The present invention is a method and apparatus for adaptively compressing and transmitting streaming video, preferably implemented in hardware as part of a codec, that adaptively applies a variable rate of compression to images in a video stream to optimize the quality attainable for a given transport bandwidth. In one or more embodiments, image frames from the video stream are divided into blocks, and a variable compression ratio compression engine compresses the blocks for transmission over a network. Depending on their compressed sizes, one or more of the compressed blocks are packaged into fixed size data packets for transmission over a network. The data packets are fed into a packet buffer. A packet servo releases packets from the buffer to achieve a desired transport data rate. The amount of compression applied by the compression engine is controlled based on the number of packets in the buffer. In one or more embodiments, a plurality of indexed compression vectors are predefined for the compression engine that provide increasing amounts of compression. In one or more embodiments, the index of the compression vector used by the compression engine is incremented when the buffer level of the packet buffer increases, and decremented when the buffer level decreases. In this manner the compression applied by the compression engine automatically adapts to (Continued)

changing entropy within the images of the video stream to optimize the video quality for a given transport data rate.

20 Claims, 10 Drawing Sheets

(56) References Cited

U.S. PATENT DOCUMENTS

| | | |
|---|---|---|
| 5,394,189 A | 2/1995 | Motomura et al. |
| 5,412,741 A | 5/1995 | Shapiro |
| 5,502,571 A | 3/1996 | Decotignie et al. |
| 5,511,094 A | 4/1996 | Lee et al. |
| 5,606,618 A | 2/1997 | Lokhoff et al. |
| 5,621,772 A | 4/1997 | Maturi et al. |
| 5,726,711 A | 3/1998 | Boyce |
| 5,732,157 A | 3/1998 | Osawa |
| 5,748,786 A | 5/1998 | Zandi et al. |
| 5,835,740 A | 11/1998 | Wise et al. |
| 5,881,176 A | 3/1999 | Keith et al. |
| 5,887,110 A | 3/1999 | Sakamoto et al. |
| 6,081,163 A | 6/2000 | Ujiie et al. |
| 6,216,145 B1 | 4/2001 | Zandi et al. |
| 6,272,180 B1 | 8/2001 | Lei |
| 6,307,971 B1 | 10/2001 | Persiantsev et al. |
| 6,339,658 B1 | 1/2002 | Moccagatta et al. |
| 6,356,665 B1 | 3/2002 | Lei et al. |
| 6,480,546 B1 | 11/2002 | Kim et al. |
| 6,674,911 B1 | 1/2004 | Pearlman |
| 6,956,600 B1 | 10/2005 | Gaylord |
| 6,965,724 B1 | 11/2005 | Boccon-Gibod et al. |
| 6,996,281 B2 | 2/2006 | Boliek et al. |
| 7,050,499 B2 | 5/2006 | Kodama et al. |
| 7,158,682 B2 | 1/2007 | Sano |
| 7,269,291 B2 | 9/2007 | Terao |
| 7,315,651 B2 | 1/2008 | Sakuyama et al. |
| 7,630,569 B2 | 12/2009 | DeCegama |
| 7,660,469 B2 | 2/2010 | Katayama |
| 9,204,170 B2 | 12/2015 | Smith |
| 2002/0001395 A1 | 1/2002 | Davis et al. |
| 2002/0064231 A1 | 5/2002 | Felts et al. |
| 2002/0131505 A1 | 9/2002 | Vidunas |
| 2003/0026488 A1 | 2/2003 | Par |
| 2003/0035475 A1 | 2/2003 | Adelaide et al. |
| 2003/0063470 A1 | 4/2003 | Grajetzky et al. |
| 2003/0179943 A1 | 9/2003 | Okada et al. |
| 2003/0202602 A1 | 10/2003 | Apostolopoulos et al. |
| 2003/0219162 A1 | 11/2003 | Sano |
| 2003/0235338 A1 | 12/2003 | Dye |
| 2004/0022322 A1 | 2/2004 | Dye |
| 2004/0091240 A1 | 5/2004 | Takei |
| 2004/0114810 A1 | 6/2004 | Boliek et al. |
| 2004/0120592 A1 | 6/2004 | Fernandes |
| 2004/0146205 A1 | 7/2004 | Becker et al. |
| 2004/0218826 A1 | 11/2004 | Terao |
| 2005/0002453 A1 | 1/2005 | Chang et al. |
| 2005/0002457 A1 | 1/2005 | Xu et al. |
| 2005/0015247 A1 | 1/2005 | Sakuyama et al. |
| 2005/0031218 A1 | 2/2005 | Berkner et al. |
| 2005/0036701 A1 | 2/2005 | Miyazawa et al. |
| 2005/0063470 A1 | 3/2005 | Bottreau et al. |
| 2005/0084168 A1 | 4/2005 | Fukuhara et al. |
| 2005/0111740 A1 | 5/2005 | Sakuyama |
| 2005/0123047 A1 | 6/2005 | Alvarez Arevalo et al. |
| 2005/0166245 A1 | 7/2005 | Shin |
| 2005/0207664 A1 | 9/2005 | Ramasastry et al. |
| 2006/0104365 A1 | 5/2006 | Li et al. |
| 2006/0167784 A1 | 7/2006 | Hoffberg |
| 2006/0177138 A1 | 8/2006 | Kadowaki |
| 2007/0097257 A1 | 5/2007 | El-Maleh et al. |
| 2007/0160147 A1 | 7/2007 | Kondo et al. |
| 2008/0147877 A1* | 6/2008 | Brown ............... H04L 41/0896 709/232 |
| 2008/0260275 A1 | 10/2008 | Ueno et al. |
| 2009/0296670 A1* | 12/2009 | Luo .................. H04L 47/10 370/338 |
| 2012/0230390 A1* | 9/2012 | Akkor ............. H04N 21/23655 375/240.02 |
| 2016/0100194 A1 | 4/2016 | Smith |
| 2016/0100195 A1 | 4/2016 | Smith |
| 2016/0105686 A1 | 4/2016 | Smith |
| 2016/0142737 A1 | 5/2016 | Smith |

FOREIGN PATENT DOCUMENTS

| | | |
|---|---|---|
| EP | 0539155 A2 | 10/1992 |
| EP | 0539155 A2 | 4/1993 |
| EP | 0590800 A2 | 9/1993 |
| EP | 0590800 A2 | 4/1994 |
| EP | 0801506 A2 | 10/1997 |
| EP | 0808068 A2 | 11/1997 |
| EP | 0843437 A2 | 5/1998 |
| EP | 0892557 | 1/1999 |
| EP | 0905978 | 3/1999 |
| EP | 0905978 A2 | 3/1999 |
| EP | 1 009 160 | 6/2000 |
| EP | 1009160 A1 | 6/2000 |
| EP | 1189145 A2 | 3/2002 |
| GB | 2247132 A | 2/1992 |
| GB | 2330473 | 4/1999 |
| JP | 8205151 | 8/1996 |
| JP | 8205151 A | 8/1996 |
| JP | 10229558 | 8/1998 |
| JP | 10229558 B2 | 8/1998 |
| JP | 11055668 | 2/1999 |
| JP | 11055668 A | 2/1999 |
| JP | 11098128 | 4/1999 |
| JP | 11098128 A | 4/1999 |
| JP | 11122617 | 4/1999 |
| JP | 11122617 A | 4/1999 |
| JP | 11136685 | 5/1999 |
| JP | 11136685 A | 5/1999 |
| JP | 11168633 | 6/1999 |
| JP | 11168633 A | 6/1999 |
| JP | 2000-174632 | 6/2000 |
| JP | 2000174632 A | 6/2000 |
| JP | 2001-298738 | 10/2001 |
| JP | 2001298738 A | 10/2001 |
| JP | 2002-135721 | 5/2002 |
| JP | 2002135721 A | 5/2002 |
| JP | 2002-171412 | 6/2002 |
| JP | 2002171412 A | 6/2002 |
| JP | 2003-003745 | 1/2003 |
| JP | 2003-023641 | 1/2003 |
| JP | 2003003745 B2 | 1/2003 |
| JP | 2003023641 A | 1/2003 |
| JP | 2003-132346 | 5/2003 |
| JP | 2003132346 A | 5/2003 |
| JP | 2003-274186 | 9/2003 |
| JP | 2003274186 A | 9/2003 |
| JP | 2004-040388 | 2/2004 |
| JP | 2004-505520 | 2/2004 |
| JP | 2004040388 B2 | 2/2004 |
| JP | 2004505520 A | 2/2004 |
| JP | 2004-112760 | 4/2004 |
| JP | 2004112760 B2 | 4/2004 |
| JP | 2004166183 | 6/2004 |
| JP | 2004166183 B2 | 6/2004 |
| JP | 2005-110185 | 4/2005 |
| JP | 2005110185 B2 | 4/2005 |
| JP | 2005-218124 | 8/2005 |
| JP | 2005218124 A | 8/2005 |
| WO | 98/19274 A1 | 5/1998 |
| WO | WO 1998/19274 A2 | 5/1998 |
| WO | 00/040033 | 7/2000 |
| WO | 00/54511 A2 | 9/2000 |
| WO | WO 2000/54511 | 9/2000 |
| WO | 03/021936 A2 | 3/2003 |

(56) References Cited

FOREIGN PATENT DOCUMENTS

| WO | WO 2003/021936 | 3/2003 |
|---|---|---|
| WO | WO 2000/040033 | 5/2004 |
| WO | 2005043919 A1 | 5/2005 |
| WO | WO 2005043919 | 5/2005 |

OTHER PUBLICATIONS

Michael J. Gormish et al., Lossless and Nearly Lossless Compression for High Quality Images, Proceedings of SPIE, Feb. 10, 1997, pp. 62-70, vol. 3025, ISSN: 0277-786X, Bellingham, VA United States of America.

Subhasis Saha et al., Use of Adaptive Integer-to-Integer Wavelet Transforms in Lossless Image Coding, Circuits and Systems 2001, ISCAS 2001, Proceedings of the 2001 IEEE International Symposium on Circuits and Systems, May 6, 2001, pp. 393-396, vol. 1 of 5, ISBN: 0-7803-6685-9, New York, NY United States of America.

European Patent Office, Extended European Search Report, dated Aug. 6, 2015, App. No. EP 15 16 4542.

Majid Rabbani et al., An Overview of the JPEG 2000 Still Image Compression Standard, Signal Processing: Image Communication, Jan. 2002, pp. 3-48, vol. 17, No. 1, ISSN: 0923-5965, Amsterdam, Netherlands.

European Patent Office, Extended European Search Report, dated Aug. 28, 2015, App. No. EP 15 16 4543.

Won Namgoong et al., Low-Power Video Encoder/Decoder Using Wavelet/TSVQ with Conditional Replenishment, 1996 IEEE International Conference on Acoustics, Speech, and Signal Processing Proceedings, ICASSP, May 7, 1996, pp. 3240-3243, vol. 6, Conf. 21, ISBN: 0-7803-3193-1, New York, United States of America.

F. W. Mounts, A Video Encoding System With Conditional Picture-Element Replenishment, Bell System Technical Journal, Sep. 1969, pp. 2545-2554, vol. 48, No. 7, ISSN: 0005-8580, Short Hills, NY, United States of America.

Peter Orbaek, A Real-Time Software Video Codec Based on Wavelets, Communication Technology Proceedings 2000, WCC—ICCT 2000, 2000 International Conference on Communication Technology Proceedings, Aug. 21, 2000, pp. 1149-1156, vol. 2, ISBN: 0-7803-6394-9, Piscataway, NJ, United States of America.

European Patent Office, Extended European Search Report, dated Aug. 28, 2015, App. No. EP 15 16 4544.

Xiaolin Wu et al., On Packetization of Embedded Multimedia Bitstreams, IEEE Transactions on Multimedia, Mar. 2001, pp. 132-140, vol. 3, No. 1, ISSN: 1520-9210, Piscataway, NJ, United States of America.

European Patent Office, Extended European Search Report, dated Sep. 2, 2015, App. No. EP 15 16 4545.

Michael W. Marcellin, JPEG2000, SMPTE Motion Imaging Journal, May/Jun. 2005.

Search Report based on GB0517501.3, dated Oct. 31, 2005.

Written Opinion based on PCT/GB2006/003008, dated Mar. 27, 2008.

International Preliminary Report on Patentability based on PCT/GB2006/003008, dated May 16, 2008.

Said Amir et al., A New, Fast, and Efficient Image Codec Based on Set Partitioning in Hierarchical Trees, IEE Transactions on Circuits and Systems for Video Technology, IEEE Service Center, vol. 6, No. 3, Jun. 1996.

J.M.Shapiro, Embedded Image Coding Using Zerotrees of Wavelet Coefficients, IEEE Transactions on Signal Processing, IEEE Service Center, v. 41, No. 12, Dec. 1, 1993.

J Oliver et al., A New Fast Lower-Tree Wavelength Image Encoder, Proceedings 2001 International Conference on Image Processing, ICIP 2001, Thessealoniki, Greece, Oct. 7-10, 2001, International Conference on Image Processing, NY, NY: IEEE, US, v.1 of 3 Conf. 8, Oct. 7, 2001, pp. 780-783.

International Search Report dated Jul. 31, 2007 from corresponding British Application Serial No. PCT/GB2006/00300.

C. Hongyang et al., An Approach to Integer Wavelet Transformations for Lossless Image Compression, Lecture Notes Pure Appl. Math. 202 (1998).

J. E. Fowler, Embedded Wavelet-Based Image Compression: State of the Art, IT-Information Technology, Oldenbourg Wissenschaaftsverlag, Munchen, DE, v. 45, No. 5, Oct. 2003, pp. 256-262.

Amir, Said, et al.: "A New, Fast, and Efficient Image Codec Based on Set Partitioning in Hierarchical Trees," *IEEE Transactions on Circuits and Systems for Video Technology*, IEEE Service Center, vol. 6, No. 3, Jun. 1996.

European Patent Office, Extended European Search Report, dated Sep. 11, 2015, App. No. EP 15 16 4545.

European Patent Office, Extended European Search Report, dated Sep. 9, 2015, App. No. EP 15 16 4543.

European Patent Office, Extended European Search Report, dated Sep. 9, 2015, App. No. EP 15 16 4544.

European Patent Office, Extended European Search Report, dated Sep. 8, 2015, App. No. EP 15 16 4542.

Fowler, J,E.: "Embedded Wavelet-Based Image Compression: State of the Art" *IT-Information Technology*, Oldenbourg Wissenschaaftsverlag, Munchen, DE, v. 45, No. 5, Oct. 2003, pp. 256-262.

Gormish, M. J., et al.: "Lossless and Nearly Lossless Compression for High Quality Images," Proceedings of the SPIE, SPIE, Bellingham, VA, US, v/ 3025, Feb. 10, 1997, pp. 62-70.

Hongyang, C. et al.: "An Approach to Integer Wavelet Transformations for Lossless Image Compression," Lecture Notes Pure Appl. Math, 202 (1998).

International • Preliminary Report on Patentibility based on PCT/GB2006/003008 dated May 16, 2008.

International Search Report dated Jul. 31, 2007 from corresponding British Application Serial No. PCT/GB2006/003008.

Japanese Office Action, Application No. 2008-527499, dated Apr. 4, 2001 (26 pages).

Japanese Office Action, Application No. 2009-184107, dated Apr. 4, 2001 (11 pages).

Japanese Office Action, Application No. 2009-184108, dated Apr. 4, 2001 (10 pages).

Japanese Office Action, Application No. 2009-184109, dated Apr. 4, 2001 (13 pages).

Japanese Office Action, Application No. 2009-184110, dated Apr. 4, 2001 (10 pages).

Marcellin, Michael W.,"JPEG2000 for Digital Cinema," *SMPTE Motion Imaging Journal*, May/Jun. 2005.

Mounts, F.W.: "A Video Encoding System with Conditional Picture-Element Replenishment," *Bell System Technical Journal*, AT&T, Short Hills, NY, US. V.48, No. 7, Sep. 1969, pp. 2545-2554.

Namgoong, W., et al: "Low-Power Video Encoder/Decoder Using Wavelet/TSVQ with Conditional Replenishment," 1996 IEEE International Conference on Acoustics, Speech and Signal Processing-Proceedings. (ICASSP). Atlanta, May 7-10, 1996, IEEE International Conference . . . NY, NY, IEEE, US, v. 6 Conference 21, May 7, 1996, pp. 3240-3243.

Oliver, J, et al.: "A New Fast Lower-Tree Wavelength Image Encoder" *Proceedings 2001 International Conference on Image Processing*. ICIP 2001. Thessaloniki, Greece, Oct. 7-10, 2001, International Conference on Image Processing, NY, NY: IEEE, US, v.1 of3 Conf. 8, Oct. 7, 2001,pp. 780-783.

Ørbaek, P.: "A Real-Time Software Video Codec Based on Wavelets," *Communication Technology Proceedings, 2000, WCC-ICCT 2000. International Conference on Beijing, China* Aug. 21-25, v. 2, Aug. 21, 2000 pp. 1149-1156.

Rabbani, M., et, al.: "An Overview of the JPEG 2000 Still Image Compression Standard," Signal Processing. Image Communication, Elsevier Science Publishers, Amsterdam, NL, v. 17, No. 1, Jan. 2002 pp. 3-48.

Saha S., et, al.: "Use of Adaptive Integer-to-Integer Wavelet Transforms in Lossless Image Coding," ISCAS 2001. Proceedings of the 2001 IEEE International Symposium on Circuits and Systems. Sydney, Australia, May 6-9, 2001, IEEE International Symposium on Circuits and Systems, NY, NY: IEEE, US, v. 1 of 5, May 6, 2001 pp. 393-396.

(56) References Cited

OTHER PUBLICATIONS

A) Search Report based on GB0517501.3 dated Nov. 1, 2005 B) Search Report based on GB0517501.3 dated Feb. 27, 2006 (claims 72-83) C) Search Report based on GB0517501.3 dated Feb. 27, 2006 (claims 59-71) D) Search Report based on GB0517501.3 dated Mar. 1, 2006 (claims 32, 37) E) Search Report based on GB0517501.3 dated Feb. 27, 2006 (claim 22).

Shapiro, M.: "Embedded Image Coding Using Zerotrees of Wavelet Coefficients," *IEEE Transactions on Signal Processing*, IEEE Service Center, v. 41, No. 12, Dec. 1, 1993.

Tae Won Hur, et al.: "An Image Coding Using Overlapped Wavelet Transform With Permutation Scan," *Circuits and Systems*, 1996., IEEE Asia Pacific Conference on Seoul, South Korea Nov. 18-21, 1996, NY, NY, USA IEEE, US, Nov. 18, 1996, pp. 14-17.

Xiaolin Wu, et al,: "On Packitization of Embedded Multimedia Bitstreams," *IEEE Transactions on Multimedia*, IEEE Service Center, Piscataway, HJ, US, v. 3, No. 1, Mar. 2001.

European Patent Office, Extended European Search Report, dated Dec. 7, 2016, App. No. EP 16 19 0991.

* cited by examiner

METHOD AND APPARATUS FOR ADAPTIVELY COMPRESSING STREAMING VIDEO

BACKGROUND OF THE INVENTION (1) Field of the Invention

The present invention relates to a method and apparatus for adaptively compressing and transmitting streaming video over a network. As used herein, the terms "streaming video" and "video stream" are used to refer to video media made up of a continuous sequence of individual image frames that are transmitted over a network from a source to a destination such that the image frames are received at the destination at approximately the same frame rate they are transmitted by the source (i.e. in "real time").

(2) Background of the Invention

Transmitting streaming video over a network, such as an intranet or the internet, presents numerous challenges. A main limiting factor is the bandwidth (commonly measured in bits/second) available to a particular video stream. Typically, the amount of data contained in an uncompressed, high definition video stream (sometimes referred to as the "bit rate," quantified, like bandwidth, in bits/second) exceeds the bandwidth available for transmission of that video stream over a particular network. For successful transmission, the effective bit rate of the transmitted video stream must be reduced to fit the available bandwidth.

Various encoding and compression methods have been devised to reduce the amount of data of a transmitted video stream. As used herein, the term "encoding" means converting the data representing video stream (i.e. the individual image frames) from one representation form to another without necessarily changing the amount of data representing the video stream, while "compressing" means reducing the amount of data representing the video stream. For example, one form of encoding is to convert an image from one "color space" (e.g. RGB) to another (e.g. YUV). Such encoding does not itself reduce the size of the video media, but can result in a form that lends itself more readily to compression.

Compression/Encoding methods are typically implemented by a hardware and/or software device referred to as a "codec." A particular codec may implement a single compression or encoding method or may combine several compression and encoding methods. Characteristics of a codec include compression ratio and compression quality. Compression ratio refers to the ratio of the size of the media after compression to its original size. Compression quality refers to how accurately the decompressed destination media recreates the source media. "Lossless" codecs compress the source media at the source and and decompress the received compressed media at the destination such that the decompressed media at the destination is an exact copy of the source media with no loss of information or quality. "Lossy" codecs achieve greater compression ratios than lossless codecs but cause some loss in information in the received, decompressed media. The human eye is more sensitive to some types of image attributes than others. Lossy codecs attempt to preserve information that the human eye is most perceptive of and limit lost information to information whose absence is less noticeable to the human eye. Codecs commonly have settings or parameters that can be varied to achieve different compression ratios, with higher compression ratios generally resulting in lower compression quality.

The degree to which an image can be compressed to achieve a given compression quality depends on the amount of detailed information in the image, sometimes referred to as the "entropy" of the image. Images, or regions of images, that have little texture and little variation in color (such as, for example, blue cloudless sky) have a low entropy. Image regions that have many color variations and texture (such as, for example, a meadow with multi-colored flowers) have a high entropy. Low entropy images (or image regions) can be compressed to a greater degree than high entropy images (or image regions) at a given compression quality.

Because the entropies of the individual images in video streams vary both within a given video stream and between different video streams, the compression ratio that will be ultimately achieved using a given codec with given settings will vary from video stream to video stream. Without prior knowledge of the entropy of each of the images of a particular video stream, it is difficult to choose the compression methodology and parameters needed to achieve a desired compressed bit rate for that video stream.

If the video stream is created from a previously recorded video media file, a "two pass" compression/encoding procedure can be used. During a first pass, the video media file is analysed to gather information about the entropy of each of the images in the file. During a second pass, that information is used to select the encoding/compression parameters that will produce the desired compression ratio while maximizing the compression quality.

Where the source of the video stream is not a recorded file but a live video feed, two pass encoding cannot be used. Instead, encoding/compression parameters must be chosen based on predicted entropy characteristics without actual knowledge of the true entropy characteristics of the video stream. As a result, optimum encoding/compression to meet a specified or available bandwidth is difficult to achieve. Instead, a video stream is likely to be either overcompressed (resulting in a reduction in video quality) or undercompressed (leading to dropped frames as a result of exceeding the available network bandwidth).

In addition to bandwidth limitations, additional challenges for transmitting video streams over a network are latency and network congestion. Data is typically sent over a network in the form of data packets. Source data is divided into individual packets of data, which may have a variable size, each of which contains addressing and other information needed for the network to convey the packet from the source to the destination. Network latency generally refers to the delay between the time that a data packet is transmitted at a source and the time the data packet is received at the destination. In the context of streaming video, for example when the video represents a live event captured by a video camera, latency may refer to the delay from the time that the live event occurs to the time the video stream portion showing that event is visible to a viewer receiving the video stream. Latency in the context of streaming video may be expressed, for example, in terms of time (i.e. seconds or milliseconds) or in terms of frames.

What is needed is a video steam encoding/decoding method and apparatus that adaptively adjusts to the changing entropy of images in a video stream to optimize the quality of the video stream when transmitted over a network at a given transport bandwidth.

BRIEF SUMMARY OF THE INVENTION

The present invention is a method and apparatus for adaptively compressing and transmitting streaming video, preferably implemented in hardware as part of a codec. The codec of the present invention adaptively applies a variable rate of compression to images in a video stream to optimize the quality attainable for a given transport bandwidth. In one or more embodiments, image frames from the video stream are divided into blocks, and a variable compression ratio compression engine compresses the blocks for transmission over a network. Depending on their compressed sizes, one or more of the compressed blocks are packaged by a data packager into fixed size data packets for transmission over a network. The data packets are fed into a packet buffer. A packet servo releases packets from the buffer at a constant rate to achieve a desired transport data rate. The amount of compression applied by the compression engine is controlled based on the number of packets in the buffer. In one or more embodiments, a plurality of indexed compression vectors are predefined for the compression engine that provide increasing amounts of compression. In one or more embodiments, the index of the compression vector used by the compression engine is incremented when the buffer level of the packet buffer increases, and decremented when the buffer level decreases. In this manner the compression applied by the compression engine automatically adapts to changing entropy within the images of the video stream to optimize the video quality for a given transport data rate.

In one or more embodiments, a maximum desired transmitted bit rate is set via a user interface. A packet delay (time interval between packets) is derived from the user setting that is basically the inverse of the maximum transmitted bit rate. The packet delay is used as the primary parameter for controlling the data packager and release of data packets to the network. The buffer level feedback compression control of the present invention can be considered a loose or indirect control of the input bit rate to the data packager, whereas the packet delay controlled output data rate to the network can be considered a precision or very tight control. The present invention provides for a very stable packet servo and therefore dependable management of network bit rate. The bit rate control is done on current data, and therefore no prediction is necessary, as in the prior art.

In one or more embodiments, the control of the transmitted bit rate is on a block basis (32 pixels by 32 video lines). This introduces a 32 video line delay, which can be considered insignificant and can be classified as a subframe latency. To the eye it is generally imperceptible, and the overall performance can be benchmarked as a zero frame delay.

DETAILED DESCRIPTION OF THE INVENTION

In the following description, numerous specific details are set forth to provide a more thorough description of the present invention. It will be apparent, however, to one skilled in the art that the present invention may be practiced without these specific details. In other instances, well-known features have not been described in detail so as not to obscure the invention.

Figure 1:
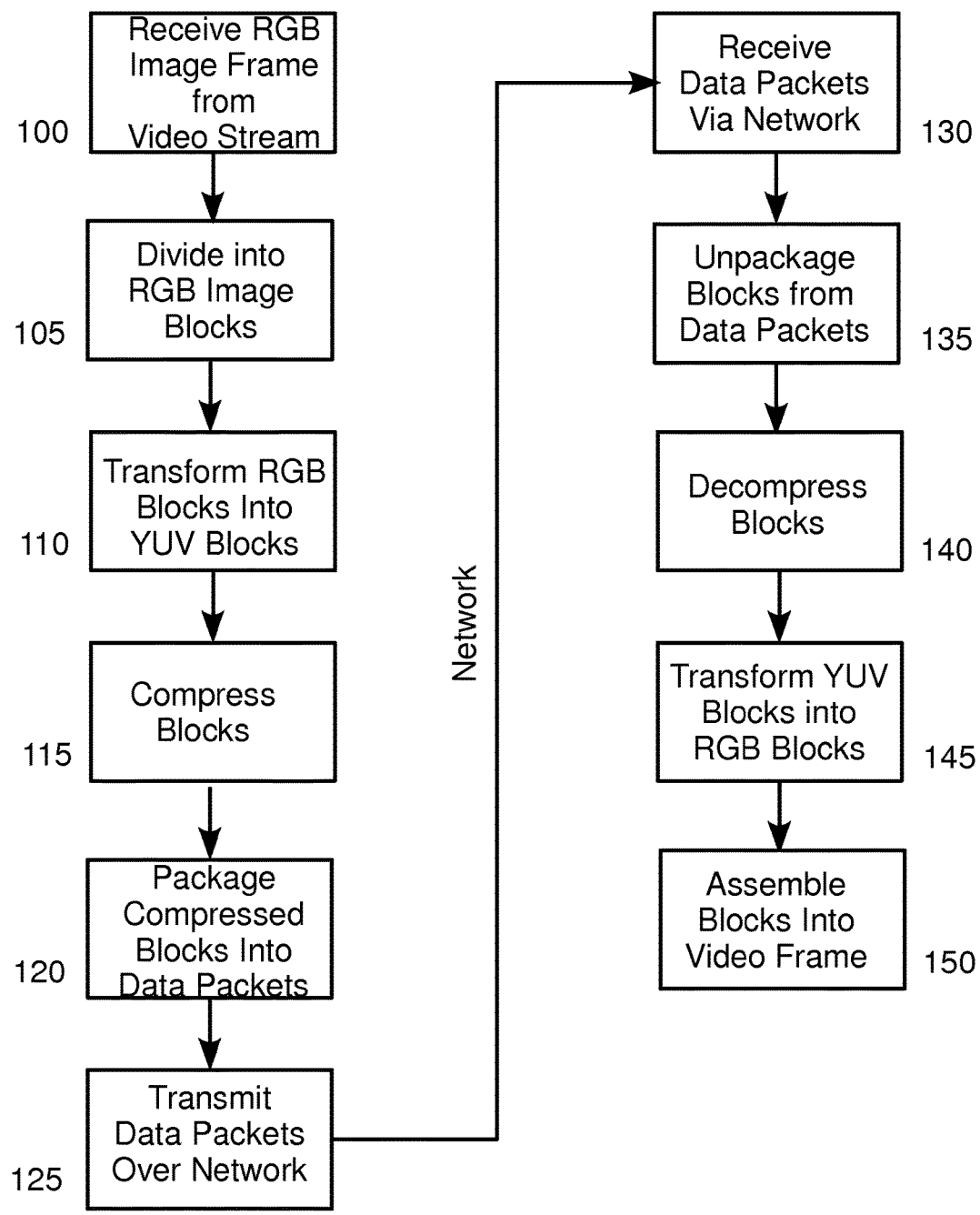
FIG. 1 is a flow chart for a prior art process for transmitting a video stream over a network.

FIG. 1 is a block diagram of a prior art process for compressing and transmitting a video stream over a network. Embodiments of the process of FIG. 1 are described, for example, in co-pending U.S. patent application Ser. No. 11/991,027 (referred to herein as "the '027 application"), published as U.S. Patent Publication No. US2010/0014590 on Jan. 21, 2010, assigned to the assignee of the present invention, which is incorporated in its entirety by reference herein. In the process of FIG. 1, an image frame from a video stream in RGB format is received, for example in real time, at step 100. At step 105, the image is divided into RGB image blocks, for example 32 by 32 pixel image blocks. At step 110, each RGB block is transformed into a YUV image block. At step 115, the YUV image data blocks are compressed, using, for example, a hardware or software codec. At step 120, the compressed data blocks are packaged into data packets appropriate for transmission over a network. Data packets may be of fixed or variable size. If a fixed size data packet is used, one, more than one, or less than one compressed block may fit into a particular size of data packet, depending on the size of the blocks after compression. For example, if the original image is an 8-bit RGB image, a 32 by 32 block will have an uncompressed size of 24,576 bits or 3072 bytes (3 Kbytes). A data packet may, for example, be sized to be carry 1 Kbyte (1024 bytes) of data. For this size data packet, an uncompressed 3 Kbyte block would fill three data packets. If the block were compressed at a 10:1 compression ratio, on the other hand, it would be only 307 bytes in size, and three similarly sized compressed blocks would fit in a single data packet.

Returning to the process of FIG. 1, after the data packets have been packaged at step 120, they are transmitted to a receiving destination over a network at step 125. The transport data rate (i.e. the rate at which the image data is transmitted from the source to the destination via the network) is the product of the rate at which data packets are transmitted (packets/sec) and the data packet size (bits/packet), either or both of which, depending on the specific process used, may be fixed or variable.

At step 130, the data packets are received at the destination. The compressed block data is unpackaged from the data packets at step 135, and the compressed block is decompressed at step 140. At step 145, the decompressed blocks are transformed from the YUV color space to the RGB color space, and the transformed RGB blocks are assembled into video frames at step 150.

The present invention is directed at improving steps 115, 120 and 125 of the process of FIG. 1 (the compression, packaging and transmission of image blocks over a network). In particular, the present invention is directed at a hardware implemented codec that adaptively alters the amount of compression applied to successive image blocks to achieve the optimum compression quality for a given video stream at a desired transport rate.

Figure 2:
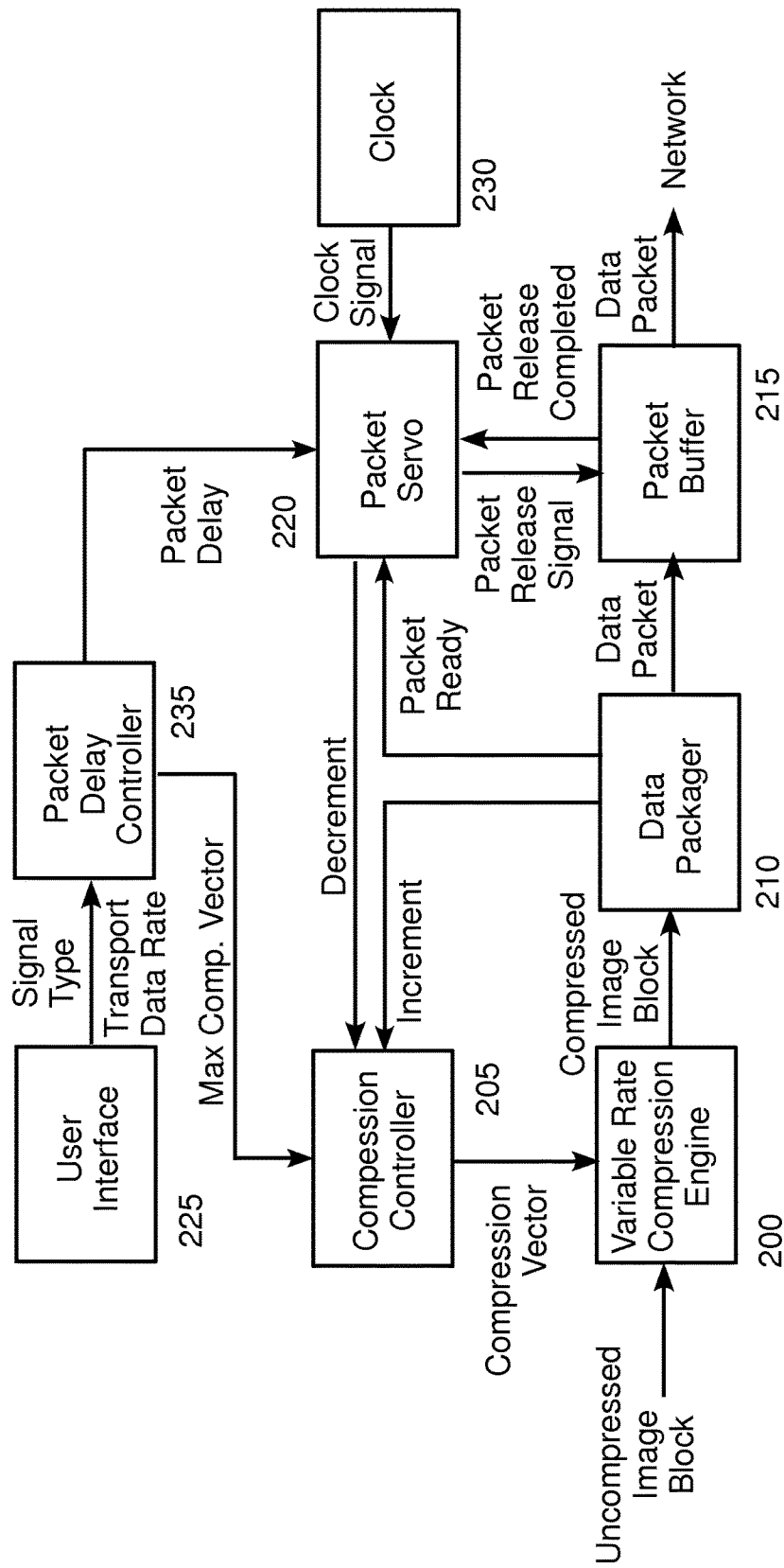
FIG. 2 is a schematic block diagram showing components used to perform automatic transport rate control in an embodiment of the invention.

FIG. 2 is a schematic block diagram showing components of an embodiment of the invention. The components shown in FIG. 2 may, for example, be implemented in one or more field programmable gate arrays ("FPGAs") or application specific integrated circuits ("ASICs"), and may form part of a codec. The components of the embodiment of FIG. 2 include a variable rate compression engine 200, a compression controller 205, a data packager 210, a packet buffer 215, a packet servo 220, a user interface 225, a clock 230 and a packet delay controller 235.

Variable rate compression engine 200 may be any type of compression engine (hardware or software implemented) whose rate of compression may be controlled by a "compression vector." As used herein, the term "compression vector" means a predefined set of parameters and/or commands that determines the amount of compression applied by variable rate compression engine 200 to the data being compressed. Examples of compression vectors include the "compression profiles" disclosed in the '027 application. In one or more embodiments, a plurality of compression vectors are pre-defined that provide increasing amounts of compression, and the compression vectors are indexed in order of increasing compression. For example, the compression vectors may be numbered from 1 to 10, with compression vector 1 producing the least compression and vector 10 producing the most compression.

Compression controller 205 may be any type of hardware or software implemented controller that determines the compression vector to be used by variable rate compression engine 200, as discussed in greater detail below. Data packager 210 may be any type of hardware or software implemented data packaging apparatus that packages data into data packets appropriate for transmission over a network. Packet buffer 215 may be any kind of hardware or software implemented memory buffer that is capable of accumulating and storing a number of the data packets produced by data packager 210. Packet buffer 215 receives data packets from data packager 210 and releases data packets to the network in response to packet release signals received from packet servo 220. In one or more embodiments, packet buffer 215 is configured to send a packet release completed signal to packet servo 220 when the release of a data packet to the network is completed. Packet servo 220 may be any type of hardware or software implemented controller that is capable of receiving a packet delay from packet delay controller 235 and a clock signal from clock 230, determining packet release times and sending packet release signals at appropriate times to packet buffer 215. In one or more embodiments, packet servo 220 is configured to send a decrement signal to compression controller 205 each time it sends a packet release signal to packet buffer 215. Clock 230 may be any type of hardware or software implemented clock that is capable of generating a clock signal for use by packet servo 220. User interface 225 may be any hardware or software implemented user interface, including a switch or touchscreen, that allows a user to specify a signal type and/or resolution (e.g. VGA, 720p, 1080i, etc.) and a desired transport data rate/bandwidth. Packet delay controller 235 may be any type of hardware or software implemented controller that is capable of receiving signal type/resolution and transport data rate signals from user interface 225 and determining an appropriate packet delay (as described in greater detail below) and providing that packet delay to packet servo 220. In one or more embodiments, packet delay controller is configured to determine a maximum compression vector and to provide that maximum compression vector to compression controller 205.

Figure 4:
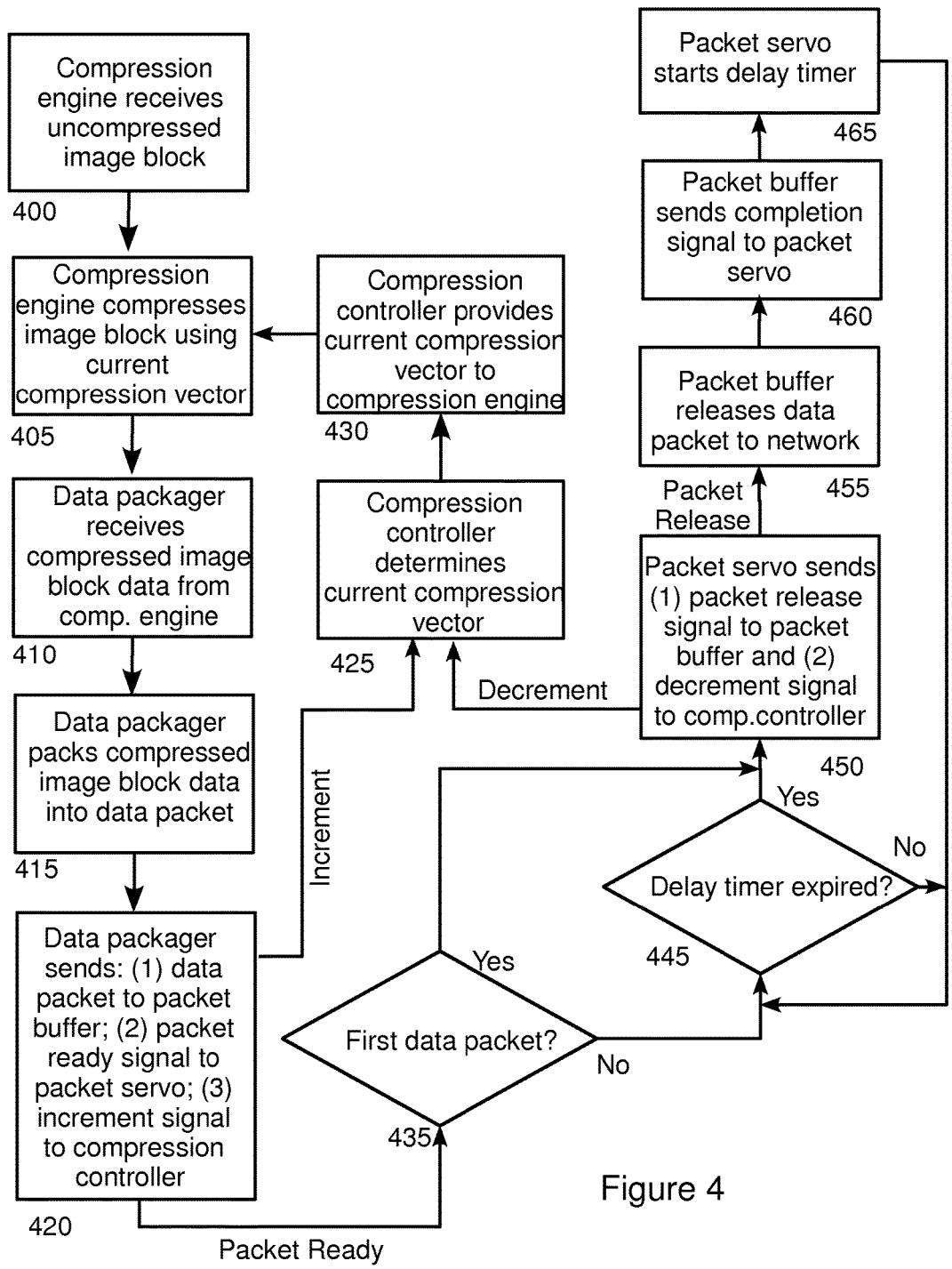
FIG. 4 is a flow chart showing a process for automatic transport rate control used by an embodiment of the invention.

FIG. 4 is a flow chart showing a process used in an embodiment of the invention. In the process of FIG. 4, compression engine 200 receives an uncompressed image block at step 400. The uncompressed image block may, for example, be an image block that has been converted from the RGB color space to the YUV color space, and transformed using a multi-level wavelet transform.

At step 405, compression engine 200 compresses the received uncompressed image block using the current compression vector. The current compression vector will be either the most recent compression vector received by compression engine 200 from compression controller 205 at step 430 (as described below), or a default compression vector, if no compression vector has yet been received from compression controller 205. In one or more embodiments, the default compression vector is the compression vector from a set of predefined, indexed compression vectors that produces the least compression (which may be no compression).

At step 410, data packager 210 receives the compressed image data block from compression engine 200. At step 415 data packager packs the compressed image block data received from compression engine 200 into data packets, which, in one or more embodiments, have a fixed, predetermined size, such as, 1 Kbit (1000 bits), 1 KByte (8192 bits), or any other fixed size. As described above, depending on the size of the compressed image block data and the size of the data packet, the resulting data packet may contain part of the compressed image block data, all of the compressed image block data, or compressed data from more than one compressed image block.

At step 420, data packager 210 sends each packaged data packet to packet buffer 215. In one or more embodiments, for each data packet sent to packet buffer 215, data packager 210 also sends a "packet ready" signal to packet servo 220 and an "increment" signal to compression controller 205. From step 420, the process branches to steps 425 and 435.

In one or more embodiments, steps 435, 445, 450 and 465 are performed by packet servo 220. Having received a "package ready" signal from data packager 210 indicating that data packager 210 has sent a new data packet to packet buffer 215, packet servo 220 at step 435 determines whether the data packet is the first data packet of a new stream, for example by checking a flag in memory previously set by packet servo 220. If so, packet servo 220 proceeds to step 450, where packet servo sends a packet release signal to packet buffer 215 and a "decrement" signal to compression controller 205. In one or more embodiments, packet servo 220 may also set a new stream flag at step 440. If packet servo 220 determines at step 435 that the current data packet is not the first packet of a new stream, packet servo 220 proceeds to step 445 to await expiration of the packet delay timer. When packet servo 220 determines at step 445 that the packet delay timer has expired, packet servo proceeds 220 to step 450 and sends a packet release signal to packet buffer 215 and a "decrement" signal to compression controller 205.

Upon receiving the packet release signal sent by packet servo 220 at step 450, packet buffer 215 releases the a data packet to the network at step 455. Once release of the data packet is completed, packet buffer 215 sends a completion signal to packet servo 220 at step 460. Thereupon packet servo 220 starts the packet delay timer at step 465, and this branch of the process returns to step 445 to await the expiration of the restarted packet delay timer.

The effect of data packager 210 sending an "increment" signal to compression controller 205 at step 420 each time a data packet is provided by data packager 210 to packet buffer 215, and packet servo 220 sending a "decrement" signal to compression controller 205 at step 450 each time packet servo 220 sends a packet release signal to packet buffer 215, is that the net value of a running sum of the "increment" and "decrement" signals provides an indication of the number of data packets contained in packet buffer 215 at any particular time. For example, if at a particular time compression controller 205 has received five (5) "increment" signals from data packager 210 (indicating that data packager 210 has sent five (5) data packets to packet buffer 215) but only two (2) "decrement" signals from packet servo 220 (indicating that two (2) data packets have been released from packet buffer 215), compression controller 205 knows that three (3) of the five (5) data packets sent by data packager 210 to packet buffer 215 remain as yet unreleased in packet buffer 215. The running total of "increment" and "decrement" signals received by compression controller 205 thus constitutes a proxy for the buffer level of packet buffer 215.

As will be apparent to those of skill in the art, in the embodiment of FIG. 4, an increase in the buffer level of packet buffer 215 indicates that data packets are being produced by data packager 210 at a rate greater than the rate at which they are being released to the network pursuant to the packet release signals issued by packet servo 220. That means that the compression applied by compression engine is too low to meet the specified data transport rate because too many data packets are being required to package the compressed data. Similarly, a decrease in the buffer level of packet buffer 215 indicates that data packets are being produced by data packager at a rate lower than the rate at which they are released to the network pursuant to the packet release signals issued by packet servo 220. That means that less compression can be applied by the compression engine (resulting in more data packets) without exceeding the specified data transport rate, resulting in higher compression quality. By selecting the compression vector based on current buffer level such that higher compression is applied by compression engine 200 as the buffer level rises and such that lower compression is applied as the buffer level falls, the present invention automatically and adaptively adjusts the compression applied to a video stream to optimize the compression quality for a given transport data rate.

Returning to the process of FIG. 4, at step 425, compression controller 205 determines a current compression vector from the net sum of the received "increment" and "decrement" signals. In one or more embodiments, compression controller 205 contains a table of predetermined indexed compression vectors, with the lowest index value corresponding to the compression vector that produces the least compression (which may be no compression) and the highest index value corresponding to the compression vector that produces the greatest compression. In one or more embodiments, the number of indexed compression values corresponds to the maximum capacity of packet buffer 215. For example, in one or more embodiments, the maximum capacity of packet buffer 215 is 32, and the number of indexed compression vectors is 32. In this embodiment, compression controller 205 selects the compression vector whose index corresponds to the current buffer level of packet buffer 215 (i.e. net sum of "increment"/"decrement" signals). For example, if the buffer level is 4, compression controller selects the compression vector whose index is 4. In other embodiments, the number of indexed compression vector is less than the maximum capacity of packet buffer 215 and compression controller selects the compression vector whose index is proportional to the current buffer level. For example, if the number of indexed compression vectors is 16 while the maximum capacity of packet buffer 215 is 32, the index of the compression vector selected by compression controller 205 will be current buffer level divided by two, rounded up to the closest integer. For example, if the current buffer level is 3 or 4, compression controller 205 will select the compression vector whose index is 2, while if the buffer level is 7 or 8, compression controller 205 will select the compression vector whose index is 4. At step 430, compression controller 205 provides the selected compression vector as the current compression vector to compression engine 200.

In one or more embodiments, compression controller 205 is provided with a "maximum compression vector" value by packet delay controller 235 for a current data stream. This "maximum compression vector" sets a limit to the amount of compression that may be applied to the current data stream by compression engine 200 to prevent excessive degradation of the video stream that could result from too high (and therefore too lossy) compression. The effect of this limit is to cause the excess compressed data to be spread over subsequent packets when required. Possible packet overflow is prevented in practice by sending any additional packets that may accrue in the unused frame interval. In one or more embodiments, the "maximum compression vector" values for various kinds of video signal types and formats are predetermined and stored in a table in memory accessable to packet delay controller 235. If the current compression vector determined by compression controller 205 from the received "increment" and "decrement" signals exceeds the "maximum compression vector" value for the current signal type, compression controller 205 replaces the current compression vector with the "maximum compression vector" and provides the "maximum compression vector" as the current compression vector to compression engine 200 at step 430.

Figure 3:
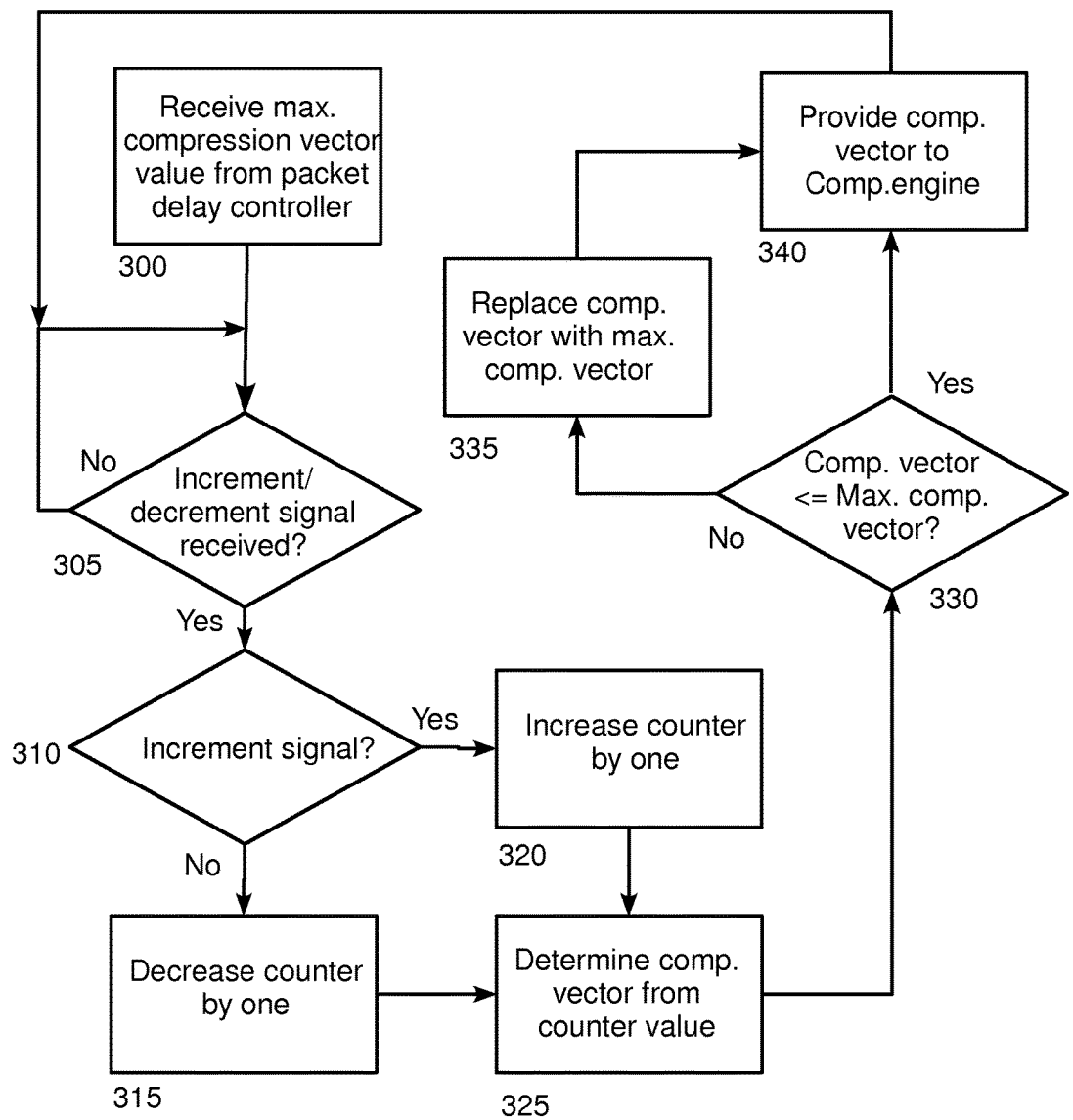
FIG. 3 is a flow chart of a process used by a compression controller of one or more embodiments of the invention.

FIG. 3 is a flow chart of a process used by compression controller 205 to determine a current compression vector in one or more embodiments of the invention. At step 300, compression controller 205 receives the maximum compression vector value for the current data stream from packet delay controller 235. At step 305, compression controller 205 awaits receipt of an "increment" signal (from data packager 210) or "decrement" signal (from packet servo 220). Once an "increment" or "decrement" signal is received, compression controller 205 determines whether the signal is an "increment" signal at step 310. If the signal is an "increment" signal, compression controller 205 increases its buffer level counter by one at step 320. If the signal is not an "increment" signal, it is a "decrement" signal, and compression controller 205 decreases its buffer level counter by one at step 315. After either increasing the buffer level counter by one at step 320 or decreasing it by one at step 315, compression controller 205 determines the current compression vector from the current value of the buffer level counter at step 325. For example, as described above, compression controller 205 in one or more embodiments determines the current compression value by selecting an indexed compression vector corresponding to the buffer level counter value. After determining the current compression vector based on the current buffer level counter value at step 325, compression controller 205, at step 330, compares that current compression vector to the maximum compression vector received from packet delay controller 235 at step 300. If the current compression vector is less than or equal to the maximum compression vector, compression controller 205 provides the current compression vector to compression engine 200 at step 340. If the current compression vector is greater than the maximum compression vector, compression controller 205 replaces the current compression vector with the maximum compression vector at step 335 and provides the maximum compression vector as the current compression vector to compression engine 200 at step 340. In either case, after providing the current compression vector to compression engine 200 at step 340, compression controller 205 returns to step 305 and awaits receipt of a subsequent "increment"/"decrement" signal.

Figure 5:
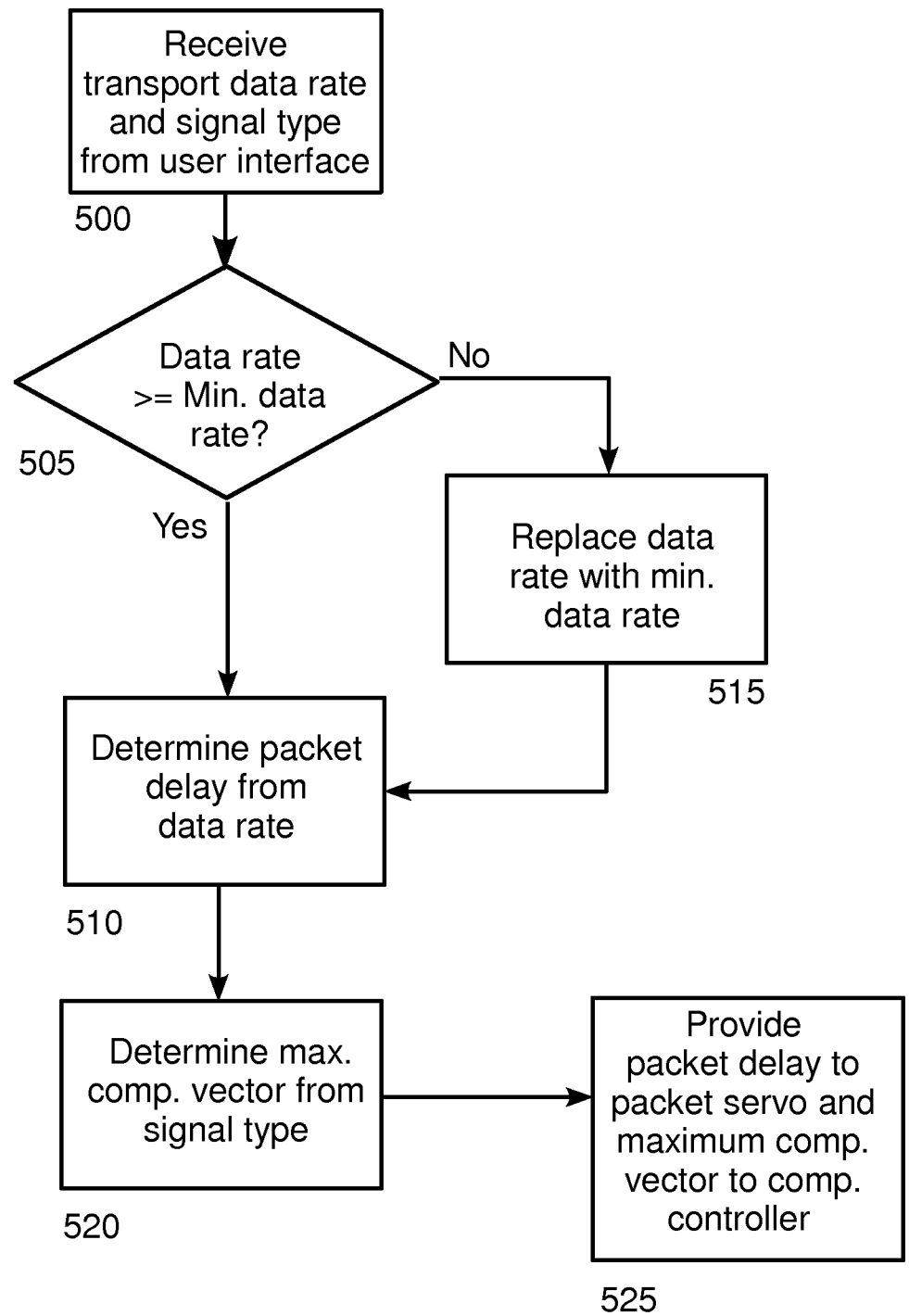
FIG. 5 is a flow chart showing a process used by a packet delay controller of one or more embodiments of the invention.

FIG. 5 is a flow chart showing a process used by packet delay controller 235 to determine the packet delay and maximum compression vector in one or more embodiments of the invention. At step 500, packet delay controller 235 receives the desired transport data rate and video signal type from user interface 225. In one or more embodiments, user interface 225 presents a menu of signal types from which a user may make a selection for a current video stream and provides a transport data rate entry field into which a user may enter a desired transport data rate. In one or more embodiments, a maximum compression vector value and a minimum transport data rate is predetermined for some or all of those signal types and stored in a manner accessible to packet delay controller 500 (for example by being stored in a look-up table in non-volatile memory). Table 1 below shows signal type selections that are provided by user interface 225 and the associated predetermined maximum compression vectors and minimum transport data rate values in one or more embodiments of the invention.

TABLE 1

| Video Resolution (pixels) | Max. Comp. Vector (Index 1-10) | Min. Transport Data Rate (mbits/sec) |
|---|---|---|
| 4096 × 2160 | 10 | 150 |
| 3840 × 2160 | 10 | 150 |
| 2560 × 1600 | 10 | 150 |
| 2048 × 2048 | 10 | 150 |
| 1920 × 1200 | 10 | 100 |
| 1920 × 1080 | 9 | 100 |
| 1600 × 1200 | 9 | 75 |
| 1280 × 1024 | 8 | 75 |
| 1280 × 720 | 7 | 75 |
| 1024 × 768 | 8 | 60 |
| 800 × 600 | 7 | 40 |

Returning to the process of FIG. 5, after receiving the desired transport data rate and signal type from user interface 225 at step 505, packet delay controller 235 compares the desired transport data rate to the predetermined minimum transport data rate for that signal type at step 505. If the desired data transport rate is less than the predetermined minimum data transport rate, packet delay controller 235 replaces the desired transport data rate with the minimum data transport rate at step 515 and determines the corresponding packet delay from the minimum transport data rate (for example using the procedures described below) at step 510. If the desired data transport rate is equal to or greater than the predetermined minimum data transport rate, packet delay controller 235 proceeds directly to step 510 and determines the corresponding packet delay from the desired transport data rate. At step 520, packet delay controller determines the maximum compression vector from the signal type (for example by consulting a table stored in memory). Packet delay controller then, at step 525, provides the packet delay determined at step 510 to packet servo 220 and the maximum compression vector determined at step 520 to compression controller 205.

As used herein, "packet delay" refers to the time period between the time at which packet buffer 215 has completed releasing a data packet to the network and the time at which packet buffer 215 begins releasing the following data packet to the network in response to receiving a packet release signal from packet servo 220. "Packet interval" refers to the time period between successive packet release signals, which determines the transport data rate of the packet stream. "Packet duration" refers to the time it takes for packet buffer 215 to release a data packet to the network.

The process of packet buffer 215 releasing data packets to a network communications link is similar to the operation of an airport baggage carrousel: packet buffer 215 drops successive packets (pieces of luggage) at intervals onto the network communications link (conveyer belt) that then travel together as a group of data packets down the communications link to their destination. As discussed above, in one or more embodiments of the invention, fixed size data packets are used. The transport data rate achieved depends on the number of data packets released by packet buffer 215 per second, i.e. the packet rate. The packet rate to achieve a desired transport data rate for a fixed data packet size may be calculated by dividing the desired transport data rate by the data packet size. For example, if the data packet size is 1 Kbit (1000 bits/packet) and the desired transport data rate is 1 mbit/sec (1000000 bits/sec), the corresponding packet rate is 1000 packets/sec:

$$\text{packet rate} = \frac{\text{transport data rate}}{\text{data packet size}} = \frac{1000000 \text{ bits/sec}}{1000 \text{ bits/packet}} = 1000 \text{ packets/sec}$$

The packet interval is the inverse of the packet rate. Thus, for the transport data rate and data packet size of the above example, the packet interval needed to achieve the desired transport data rate is 1/1000 second/packet, or 1000 μsecs/packet:

$$\text{packet interval} = \frac{\text{data packet size}}{\text{transport data rate}} =$$

$$\frac{1000 \text{ bits/packet}}{1000000 \text{ bits/sec}} = .001 \text{ secs/packet} = 1000 \text{ μsecs/packet}$$

Figure 9:
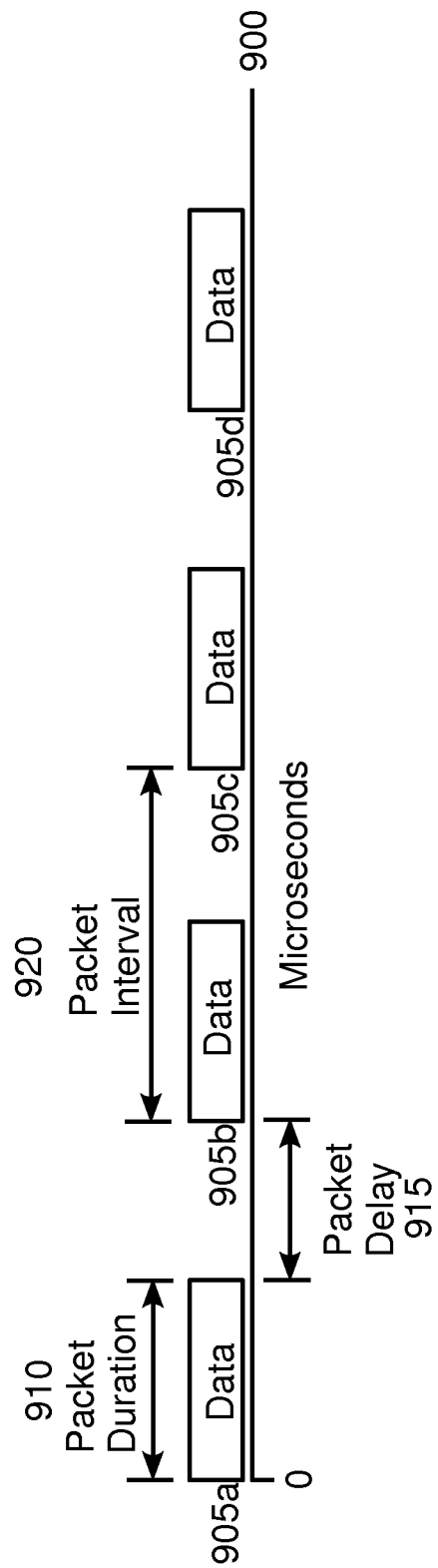
FIG. 9 is a timing diagram illustrating packet delay used by one or more embodiments of the invention.

FIG. 9 shows the relationship between packet interval 920, packet duration 910, and packet delay 915 for a series of successive data packets 905a, 905b, 905c and 905d on a timeline 900 that may, for example, represent data packets released by packet buffer 215 to a network communications link. Packet duration 910 is the period of time it takes packet buffer 215 to release a packet onto a network communications link. The magnitude or length of packet duration 910 depends upon a number of factors, including the packet size and the system clock frequency (which determines how quickly a data packet can be read out of memory). The available network bandwidth may also effect the packet duration, if the network bandwidth is smaller than the rate at which packet buffer reads the packet data out of memory and releases it onto the network.

As shown in FIG. 9, the length of packet delay 915 is the difference between the length of packet interval 920 and the length of packet duration 910. That is:

$$\text{packet delay} = \text{packet interval} - \text{packet duration} = \frac{\text{data packet size}}{\text{transport data rate}} - \text{packet duration}$$

Because the packet delay cannot be less than zero, the maximum transport data rate that can be achieved for a given data packet size and packet duration is the transport data rate for which the packet delay becomes zero, namely when the packet interval equals the packet duration. From the above equation for packet delay, the maximum transport data rate is:

$$\text{transport data rate (bits/sec)} = \frac{\text{data packet size (bits/packet)}}{\text{packet duration (secs/packet)}}$$

Figure 10:
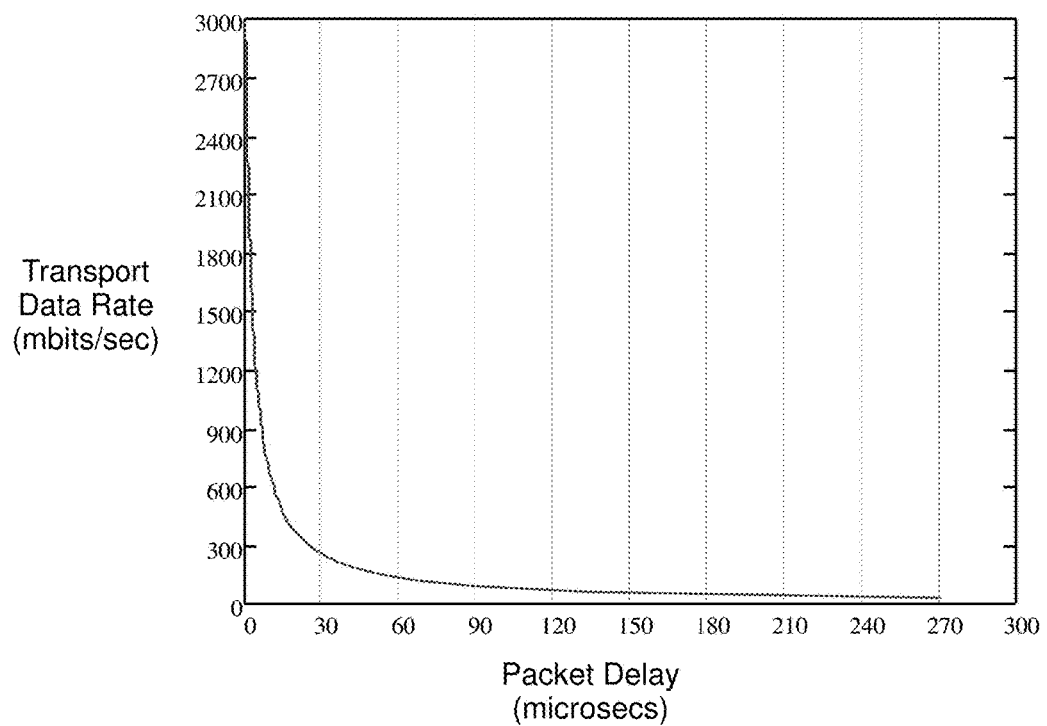
FIG. 10 is a graph of packet delay as a function of transport data rate for one or more embodiments of the invention.

In one embodiment of the invention, the data packet size is 1 KByte (8192 bits/packet), the clock frequency is $210 \times 10^6$, and memory is read by packet buffer at a rate of 16 bits per clock cycle. The packet duration is this embodiment is $(512)/(210 \times 10^6) = 2.438 \times 10^{-6}$ secs (2.438 μsecs), and the maximum transport data rate at a packet delay of zero is $(8192)/(2.438 \times 10^{-6}) = 3360$ mbits/sec. The packet delays for some other transport data rates for this embodiment are set forth in Table 2 below, and the relationship between transport data rate and packet delay is shown in FIG. 10.

TABLE 2

| Transport Data Rate (mbits/sec) | Packet Delay (μsecs) |
|---|---|
| 3000 | 0.293 |
| 2000 | 1.66 |
| 1000 | 5.75 |
| 200 | 38.56 |
| 100 | 79.48 |
| 50 | 161.40 |

Figure 6:
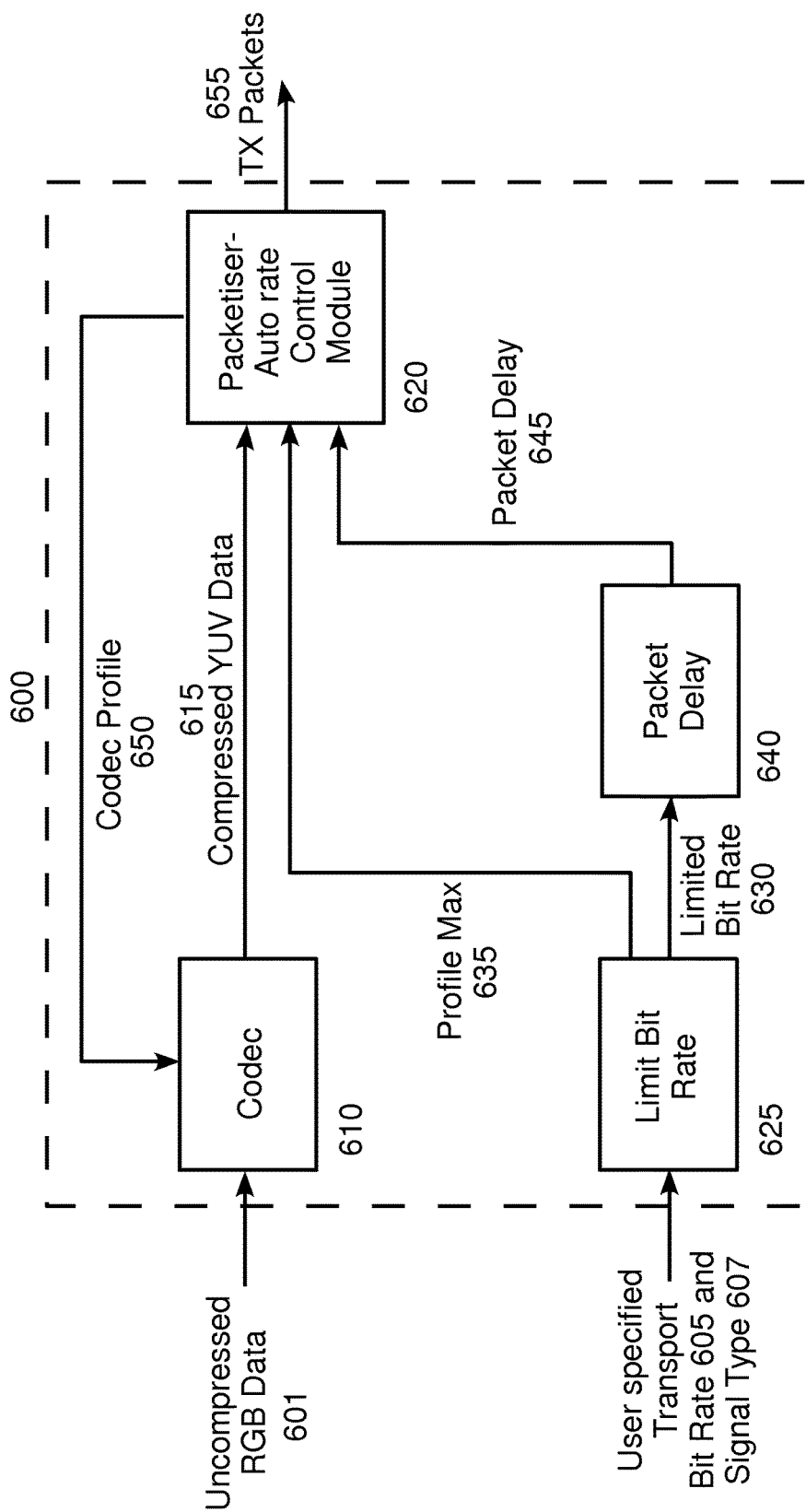
FIG. 6 is a schematic of the logic modules used to perform automatic transport rate control in an embodiment of the invention.

FIG. 6 is a schematic diagram of logic modules of one or more embodiments of the invention. The logic modules may be implemented, for example, in a FPGA or ASIC or other hardware or software component or combination of components, referred to herein as the "implementation environment" and represented in FIG. 6 by dotted line 600. Implementation environment 600 may, for example, comprise compression engine 200, compression controller 205, data packager 210, packet buffer 215, packet servo 220, clock 230, and packet delay controller 235 of the embodiment of FIG. 2.

In the embodiment of FIG. 6, logic modules included in implementation environment 600 include codec module 610, packetiser-auto rate control module 620, limit bit rate module 625, and packet delay module 640. Implementation environment 600 receives uncompressed RGB data 601, user specified transport bit rate 605, and user specified signal type 607 as inputs and provides transmission ("TX") data packets 655 as an output.

Uncompressed RGB data 601 is received by codec module 610, which also receives codec profile 650 (an embodiment of a compression vector) from packetiser—auto rate control module 655. Codec module 610 converts and compresses uncompressed RGB data 601 using codec profile 650 into compressed YUV data 615 and provides compressed YUV data 615 to packetiser—auto rate control module 620.

User specified transport bit rate 605 and signal type 607 are received by limit bit rate module 625. From user specified transport bit rate 605 and signal type 607, limit bit rate determines profile max 635 (an embodiment of a maximum compression vector) and limited bit rate 640, as described with respect to FIG. 8 below. Limit bit rate module 625 provides profile max 635 to packetiser—auto rate control module 620 and limited bit rate 630 to packet delay module 640. From limited bit rate 630, packet delay module 640 determines packet delay 645 and provides packet delay 645 to packetiser—auto rate control module 620.

Figure 7:
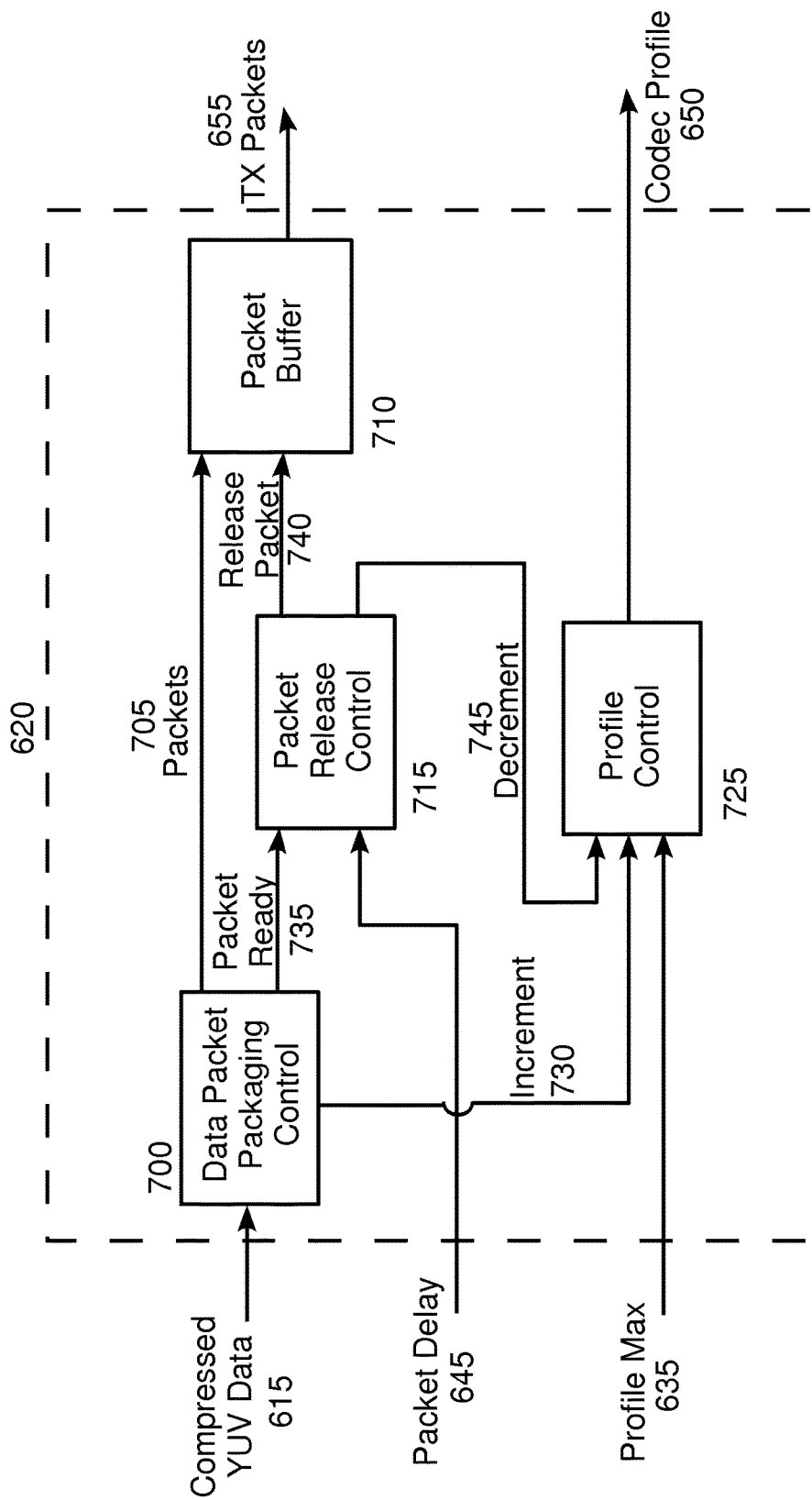
FIG. 7 is a schematic of the logic modules of a packetiser—auto rate control module of one or more embodiments of the invention.

FIG. 7 is a schematic diagram of the internal logic modules of packetiser—auto rate control module 620 in one or more embodiments of the invention. In the embodiment of FIG. 7, logic modules included in packetiser—auto rate control module 620 include data packet packaging control module 700, packet buffer module 710, packet release control module 715 and profile control module 725.

Data packet packaging control module 700 receives compressed YUV data 615 (from codec module 610) as an input and provides data packets 705, "increment" signal 730 and packet ready signal 735 as outputs.

Packet release control module 715 receives packet ready signal 735 (from data packet packaging control module 700) and packet delay 645 (from packet delay module 640) as inputs and provides release packet signal 740 and "decrement" signal 745 as outputs.

Packet buffer module 710 receives data packets 705 (from data packet packaging control module 700) and release packet signal 740 (from packet release control module 715) as inputs and provides transmission data packets 655 as an output.

Profile control module 725 receives "decrement" signal 745 (from packet release control module 715), "increment" signal 730 (from data packet packaging control module 700) and profile max 635 (from limit bit rate module 625) as inputs and provides codec profile 650 as an output.

Figure 8:
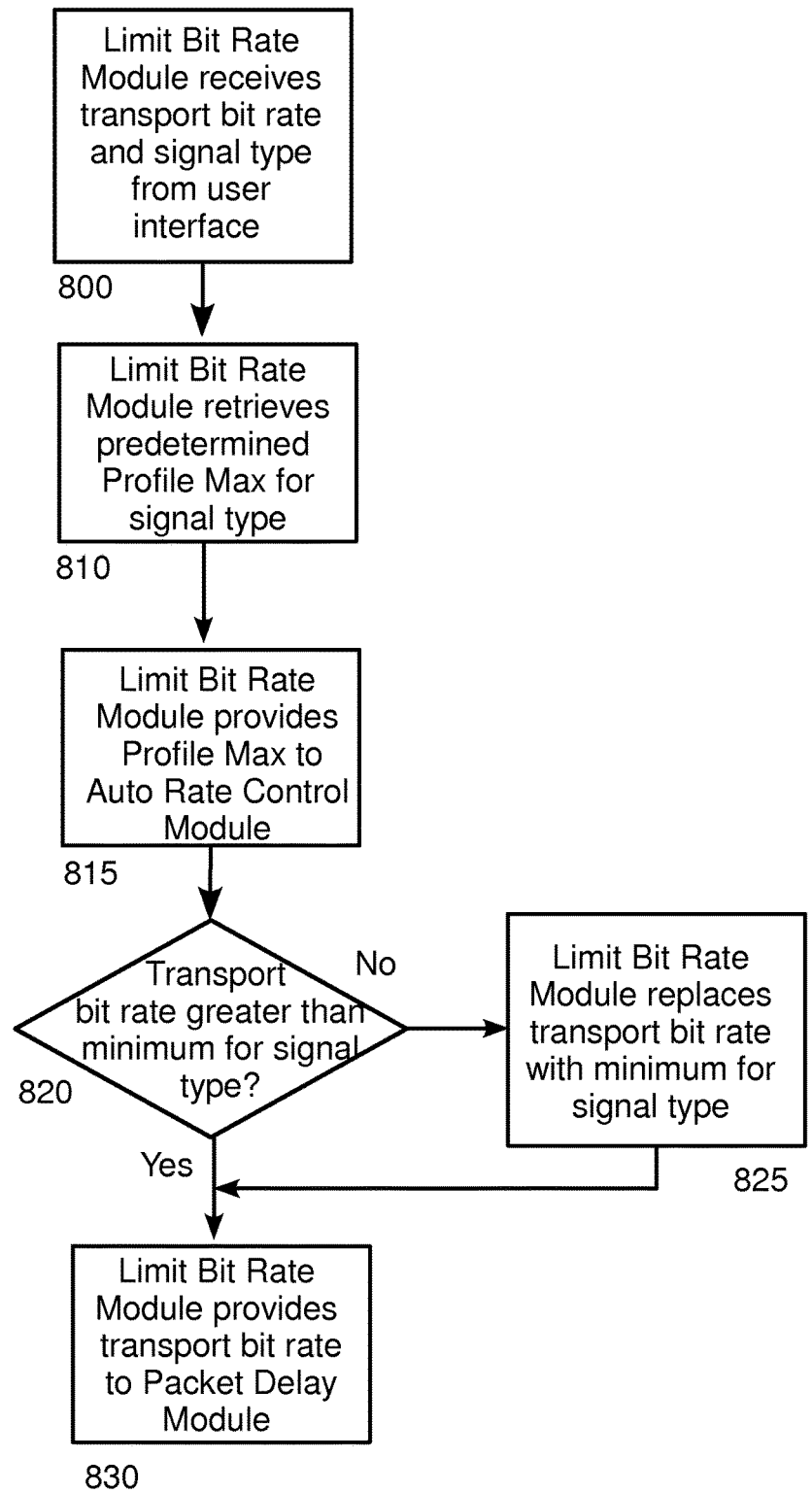
FIG. 8 is a flow chart showing a process used by a limit bit rate module of one or more embodiments of the invention.

FIG. 8 is a flow chart showing a process performed by limit bit rate module 625 in one or more embodiments of the invention. Pseudo code for an embodiment of the process of FIG. 8 is set forth in Appendix 1.

In the process of FIG. 8, limit bit rate module 625 receives user specified transport bit rate 605 and signal type 607, for example from user interface 225, at step 800. At step 810, limit bit rate module 625 retrieves predetermined profile max 635 for signal type 607, for example from a look-up table in memory. At step 815, limit bit rate module 625 provides profile max 635 to packetiser—auto rate control module 620. At step 820, limit bit rate module 625 determines whether user specified transport bit rate 605 is greater than or equal to a predetermined minimum transport bit rate for signal type 607, which predetermined minimum transport bit rate may be retrieved by limit bit rate module, for example, from a look-up table in memory. If user specified transport bit rate 605 is greater than or equal to the minimum transport data rate for signal type 607, limit bit rate module provides user specified transport bit rate 605 to packet delay module 640 as limited bit rate 630 at step 830. If user specified transport bit rate 605 is not greater than or equal to the minimum transport data rate for signal type 607, limit bit rate module replaces user specified transport bit rate 605 with the minimum transport data rate for signal type 607 at step 825 and provides the minimum transport data rate for signal type 607 to packet delay module 640 as limited bit rate 630 at step 830.

Thus, a method and apparatus for adaptively compressing and transmitting streaming video over a network has been disclosed. Although the present invention has been described with respect to certain specific embodiments comprising specific arrangements and functions of components and modules, it will be clear to those skilled in the art that the inventive features of the present invention are applicable to other embodiments as well, all of which are intended to fall within the scope of the present invention.

The invention claimed is:

1. An apparatus for adaptively compressing a video stream comprising:
   a variable compression rate compression engine configured to compress incoming uncompressed image data blocks of a video stream, where said video stream includes images having different entropy, using a compression vector selected from a set of predetermined compression vectors to produce compressed image data blocks;
   a data packager configured to receive said compressed image data blocks from said compression engine and to package said compressed image data blocks into data packets;
   a packet buffer configured to receive said data packets from said data packager, store said data packets, release said data packets in response to data packet release signals received from a packet servo configured to release packets from said packet buffer at a constant rate to achieve a desired transport data rate;
   said packet delay controller being configured to receive a desired transport data rate from a user interface, to determine a delay time between said data packets corresponding to said transport data rate, and to provide said delay time to said packet servo;
   said packet servo being configured to receive said delay time from said packet delay controller, and to send said packet release signals to said packet buffer according to said delay time;
   a compression controller configured to maintain a buffer level count indicating a level of said data packets in said packet buffer, to determine a current compression vector from said buffer level count, to receive a maximum compression vector, determine if said current compression vector is greater than said maximum compression vector, and:
      if said current compression vector is greater than said maximum compression vector, provide said maximum compression vector to said compression engine and cause an additional packet that may accrue to be sent in an unused frame interval, and
      if said current compression vector is less than or equal to said maximum compression vector, provide said current compression vector to said compression engine that automatically adapts to changing entropy within said images of said video stream based at least in part on said desired transport data rate.

2. The apparatus of claim 1 wherein said packet servo is further configured to send decrement signals to said compression controller.

3. The apparatus of claim 2 wherein said data packager is further configured to send increment signals to said compression controller.

4. The apparatus of claim 3 wherein said compression controller is further configured to maintain said buffer level count based upon said decrement and increment signals.

5. The apparatus of claim 3 wherein said data packager is configured to package said compressed data blocks in data packets having a fixed size.

6. The apparatus of claim 1 comprising a logical auto rate control module comprising logical modules that implement functions of said data packager, packet buffer, compression controller, and packet servo.

7. The apparatus of claim 1 further comprising a non-volatile memory comprising a plurality of predetermined maximum compression vectors for a plurality of video stream formats.

8. The apparatus of claim 1 further comprising a non-volatile memory comprising a plurality of predetermined minimum transport data rates for a plurality of video stream formats.

9. The apparatus of claim 7 wherein said packet delay controller is configured to receive a current video stream format from said user interface.

10. The apparatus of claim 9 wherein said packet delay controller is configured to select a current maximum compression vector for said current video stream format from said non-volatile memory and provide said current maximum compression vector to said compression controller.

11. A method for adaptively compressing a video stream comprising a series of image data blocks by a video encoding apparatus, where said video stream includes images having different entropy, the method comprising:
   compressing each of said data blocks using a current compression vector selected from a set of predetermined compression vectors to produce compressed data blocks;
   packaging said compressed data blocks into a plurality of data packets;
   storing said data packets in a packet buffer;
   determining a packet delay time from a transport data rate;
   releasing, at a desired transport rate, said data packets from said packet buffer at intervals based on said packet delay time;
   maintaining a buffer level count indicating a current level of data packets in said packet buffer;
   determining said current compression vector from said current buffer level count;
   accessing a maximum compression vector;
   determining if said current compression vector is greater than said maximum compression vector;
   if said current compression vector is greater than said maximum compression vector, performing data packet compression using said maximum compression vector and causing an additional packet that may accrue to be sent in an unused frame interval, and
   if said current compression vector is less than or equal to said maximum compression vector, performing data packet compression using said using said current compression.

12. The method of claim 11 further comprising receiving said transport data rate from a user interface.

13. The method of claim 11 further comprising receiving a format type of said video stream from a user interface.

14. The method of claim 13 wherein determining said current compression vector comprises determining a maximum compression vector from said format type.

15. The method of claim 13 wherein determining said packet delay time comprises determining a minimum transport data rate from said format type.

16. The method of claim 11 wherein maintaining said buffer level count comprises incrementing said buffer level count for each data packet packaged in said packaging step.

17. The method of claim 16 wherein maintaining said buffer level count comprises decrementing said buffer level count for each data packet released from said packet buffer.

18. The method of claim 11 wherein said packaging comprises packaging said compressed data blocks into a plurality of fixed size data packets.

19. The method of claim 11 wherein said releasing said data blocks from said packet buffer comprises monitoring a timer.

20. The method of claim 19 wherein said monitoring of said timer comprises starting said timer after one of said data blocks is released from said packet buffer.

* * * * *

UNITED STATES PATENT AND TRADEMARK OFFICE
CERTIFICATE OF CORRECTION

PATENT NO. : 9,992,252 B2
APPLICATION NO. : 14/868941
DATED : June 5, 2018
INVENTOR(S) : Peter Lionel Smith Page 1 of 1

It is certified that error appears in the above-identified patent and that said Letters Patent is hereby corrected as shown below:

In the Drawings

Drawing Sheet 2 of 10, Figure 2, Line 7, Change "Compession" to --compression--.

In the Specification

Column 1, Line 52, Change "and and" to --and--.

Column 6, Line 67, Change "the a" to --the--.

In the Claims

Column 14, Line 62, Claim 11, change "using said using said" to --using said--.

Signed and Sealed this
Eleventh Day of September, 2018

Andrei Iancu
*Director of the United States Patent and Trademark Office*